US012757135B2

(12) United States Patent
Ma

(10) Patent No.: US 12,757,135 B2
(45) Date of Patent: Oct. 6, 2026

(54) VALIDITY PERIOD DETERMINING METHOD AND APPARATUS, DEVICE, AND STORAGE MEDIUM

(71) Applicant: GUANGDONG OPPO MOBILE TELECOMMUNICATIONS CORP., LTD., Dongguan (CN)

(72) Inventor: Dongjun Ma, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 226 days.

(21) Appl. No.: 18/392,848

(22) Filed: Dec. 21, 2023

(65) Prior Publication Data

US 2024/0129867 A1 Apr. 18, 2024

Related U.S. Application Data

(63) Continuation of application No. PCT/CN2021/101812, filed on Jun. 23, 2021.

(51) Int. Cl.
*H04B 7/185* (2006.01)
*H04W 56/00* (2009.01)
*H04W 84/06* (2009.01)

(52) U.S. Cl.
CPC ....... *H04W 56/001* (2013.01); *H04B 7/18519* (2013.01); *H04W 84/06* (2013.01)

(58) Field of Classification Search
CPC . H04W 56/001; H04W 72/21; H04W 72/231; H04W 72/30; H04W 80/02; H04W 84/06
See application file for complete search history.

(56) References Cited

U.S. PATENT DOCUMENTS

2012/0256790 A1* 10/2012 Derbez ................. H04W 28/10 342/357.42
2016/0050015 A1 2/2016 McCune et al.
2020/0305222 A1* 9/2020 Ingale .................. H04B 7/2615

FOREIGN PATENT DOCUMENTS

CN 108318899 A 7/2018
CN 108700669 A 10/2018
(Continued)

OTHER PUBLICATIONS

Communication pursuant to Article 94(3) EPC of European application No. 21946383.3 issued on Mar. 24, 2025.
(Continued)

*Primary Examiner* — Tuan Pham
(74) *Attorney, Agent, or Firm* — Sheppard, Mullin, Richter & Hampton LLP

(57) ABSTRACT

Related to the technical field of communication, validity period determinations are provided. For example, a terminal determines a validity period of ephemeris information, the validity period meeting a synchronization requirement of the terminal. By determining the validity period of the ephemeris information that meets the synchronization requirement, the terminal can ensure the real-time accuracy of the ephemeris information at the terminal, thereby ensuring that a time delay and a Doppler frequency shift calculated by the terminal based on the ephemeris information have only small errors. Since the errors do not exceed a range tolerated by the synchronization requirement, the synchronization performance of the terminal can be guaranteed.

10 Claims, 3 Drawing Sheets

(56) References Cited

FOREIGN PATENT DOCUMENTS

| | | | |
|---|---|---|---|
| CN | 109842932 | A | 6/2019 |
| CN | 112558117 | A | 3/2021 |
| WO | 2021219022 | A1 | 11/2021 |

OTHER PUBLICATIONS

Extended European search report of counterpart European application No. 21946383.3 issued on Aug. 22, 2024.
Thales, Considerations on satellite ephemeris, R2-2007574, 3GPP Draft, 3GPP TSG RAN WG2 eMeeting #111-e e-Meeting, Aug. 17-28, 2020, Aug. 6, 2020, the whole document.
International Search Report and Written Opinion dated Mar. 7, 2022 in International Application No. PCT/CN2021/101812. English translation attached.
Mediatek, "UE Time and frequency Synchronisation for NR-NTN Document for: Discussion and Decision" 3GPP TSG RAN WG1 Meeting #105-e R1-2104565,May 11, 2021, Section 2.4.3.
Ericsson, "On UL time and frequency synchronization enhancements for NTN" 3GPP TSG-RAN WG1 Meeting #105-e R1-2104811,May 12, 2021,Section 5.2.
ZTE, "Discussion on UL synchronization for NR-NTN" 3GPP TSG RAN WG1 #105-e R1-2105190,May 12, 2021,Section 4.2.
Thales,. About the need for Satellite identifier in 3GPP, R2-1908843. 3GPP TSG RAN WG2 Meeting #107;,Aug. 30, 2019(Aug. 30, 2019),sections 2-3.
First office action of Chinese application No. 202180095170.0 issued on Jun. 12, 2026.

* cited by examiner

VALIDITY PERIOD DETERMINING METHOD AND APPARATUS, DEVICE, AND STORAGE MEDIUM

CROSS-REFERENCE TO RELATED APPLICATIONS

The application is a continuation of International Application No. PCT/CN2021/101812 filed on Jun. 23, 2021, the entire content of which is incorporated herein by reference.

TECHNICAL FIELD

The present disclosure relates to the technical field of satellite communication, and more particularly, to a validity period determining method and apparatus, a device, and a storage medium.

BACKGROUND

In the Non-Terrestrial Network (NTN) system, due to high-speed movement of a satellite, the time delay and Doppler frequency shift estimated by a UE based on its own position and ephemeris information of the satellite will change rapidly with the high-speed movement of the satellite. As a result, problems such as high time delay and Doppler frequency shift may occur, which will affect the synchronization performance of the entire communication system.

SUMMARY

The present disclosure provides a validity period determining method and apparatus, a device, and a storage medium, capable of ensuring a validity period of ephemeris information, so as to meet a synchronization requirement of a terminal.

According to an aspect of an embodiment of the present disclosure, a validity period determining method is provided. The method includes: determining, by a terminal, a validity period of ephemeris information, the validity period meeting a synchronization requirement of the terminal.

According to an aspect of an embodiment of the present disclosure, a validity period determining method is provided. The method includes: configuring, by a network device, a validity period of ephemeris information for a terminal, the validity period meeting a synchronization requirement of the terminal.

According to an aspect of an embodiment of the present disclosure, a validity period determining apparatus is provided. The apparatus includes: a determining module configured to determine a validity period of ephemeris information, the validity period meeting a synchronization requirement of a terminal.

According to an aspect of an embodiment of the present disclosure, a validity period determining apparatus is provided. The apparatus includes: a configuring module configured to configure a validity period of ephemeris information for a terminal, the validity period meeting a synchronization requirement of the terminal.

According to an aspect of an embodiment of the present disclosure, a terminal is provided. The terminal includes: one or more processors; and one or more transceivers connected to the one or more processors. The one or more processors are configured to perform the above validity period determining method.

According to an aspect of an embodiment of the present disclosure, a network device is provided. The network device includes: one or more processors; and one or more transceivers connected to the one or more processors. The one or more processors are configured to perform the above validity period determining method.

According to an aspect of an embodiment of the present disclosure, a computer-readable storage medium is provided. The computer-readable storage medium has a computer program stored therein. The computer program is configured to be executed by a processor, so as to perform the above validity period determining method.

According to an aspect of an embodiment of the present disclosure, a computer program product or computer program is provided. The computer program product or computer program includes computer instructions. The computer instructions are stored in a computer-readable storage medium, and a processor reads from the computer-readable storage medium and executes the computer instructions, so as to perform the above validity period determining method.

The technical solutions according to the present disclosure have at least the following advantageous effects.

By determining the validity period of the ephemeris information that meets the synchronization requirement, the real-time accuracy of the ephemeris information at the terminal can be ensured, thereby ensuring that a time delay and a Doppler frequency shift calculated by the terminal based on the ephemeris information have only small errors. Since the errors do not exceed a range tolerated by the synchronization requirement, the synchronization performance of the terminal can be guaranteed.

BRIEF DESCRIPTION OF DRAWINGS

In order to describe the technical solutions in the embodiments of the present disclosure more clearly, the drawings to be used in the description of the embodiments will be briefly introduced below. Obviously, the drawings in the following description are only some embodiments of the present disclosure, and other drawings can be obtained by those of ordinary skill in the art based on these drawings without any inventive efforts.

DESCRIPTION OF EMBODIMENTS

Figure 1:
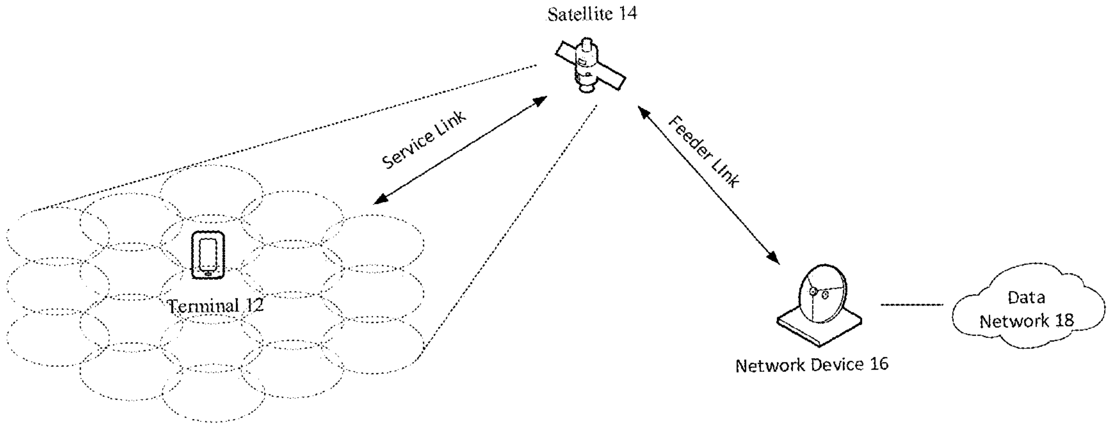
FIG. 1 is a structural diagram of a communication network architecture according to an embodiment of the present disclosure.

The embodiments of the present disclosure will be further described in detail below with reference to the accompanying drawings, such that the objects, technical solutions, and advantages of the present disclosure will become more apparent.

The network architecture and service scenarios described in the embodiments of the present disclosure are intended to illustrate the technical solutions of the embodiments of the present disclosure more clearly, and do not constitute any limitation on the technical solutions according to the embodiments of the present disclosure. It can be appreciated by those of ordinary skill in the art that with the evolution of the network architecture and the emergence of new service scenarios, the technical solutions according to the embodiments of the present disclosure will be equally applicable to similar technical problems.

Currently, the 3GPP is studying the NTN technology. In the NTN system, communication services are typically provided to terrestrial UEs by means of satellite communication. Compared with terrestrial cellular network communication, the satellite communication has many unique advantages. First of all, satellite communication is not limited by the user's geographical area. For example, typical terrestrial communication cannot cover areas such as oceans, mountains, deserts, etc., where communication devices cannot be set up or areas where communication coverage cannot be provided due to sparse population. For satellite communication, since a single satellite can cover a large ground area, and satellites can orbit around the earth, theoretically every corner of the earth can be covered by satellite communication. Secondly, satellite communication has a significant social value. Satellite communication can provide coverage at low cost in remote mountainous areas and poor and undeveloped countries or regions, such that people in these regions can enjoy advanced voice communication and mobile internet technologies, which is conducive to narrowing the digital divide between these regions and developed regions and promoting development in these regions. Thirdly, the satellite communication has a long range, and the communication cost does not increase significantly when the communication range increases. Finally, the satellite communication has high stability and is not limited by natural disasters.

According to different orbital altitudes, communication satellites are divided into Low-Earth Orbit (LEO) satellites, Medium-Earth Orbit (MEO) satellites, Geostationary Earth Orbit (GEO) satellites, High Elliptical Orbit (HEO) satellites, etc. Currently, researches mainly focus on LEO and GEO.

LEO:

LEO satellites have an altitude range of 500 km to 1500 km, and the corresponding orbital period is about 1.5 hours to 2 hours. The signal propagation delay of single-hop communication between UEs is generally lower than 20 ms. The maximum satellite visible time is 20 minutes. The signal propagation distance is short, the link loss is low, and the transmit power requirements of UEs are not high.

GEO:

GEO satellites have an orbit altitude of 35786 km and revolve around the earth at a period of 24 hours. The signal propagation delay of single-hop communication between UEs is generally 250 ms.

In order to ensure the communication satellite coverage and improve the system capacity of the entire satellite communication system, communication satellites use multiple beams to cover the ground area. A communication satellite can form dozens or even hundreds of beams to cover the ground area. A satellite beam can cover a ground area having a diameter of tens to hundreds of kilometers.

Figure 2:
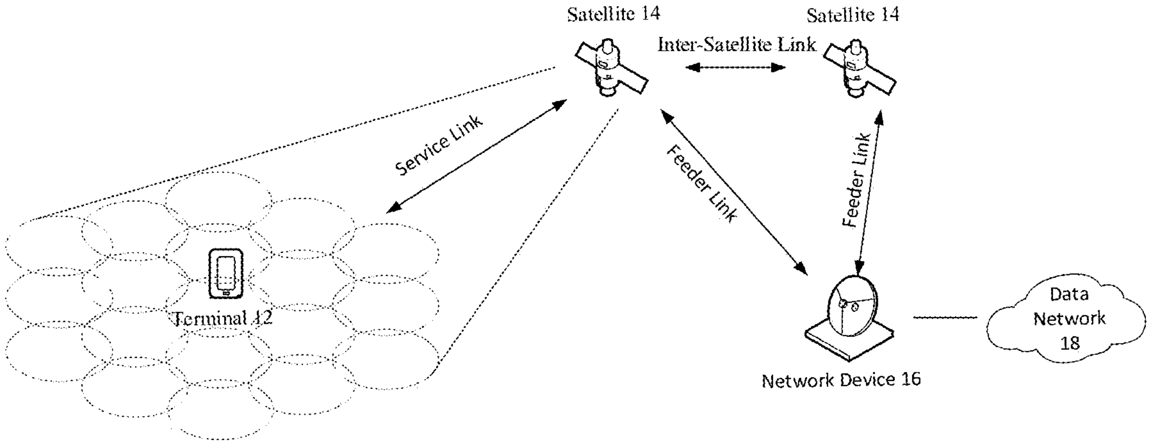
FIG. 2 is a structural diagram of a communication network architecture according to an embodiment of the present disclosure.

Currently, there are at least two NTN scenarios: an NTN scenario based on transparent payload and an NTN scenario based on regenerative payload. FIG. 1 shows a schematic diagram of an NTN scenario based on transparent payload, and FIG. 2 shows a schematic diagram of an NTN scenario based on regenerative payload.

The NTN network consists of the following network elements:

- one or more network devices 16 for connecting a satellite 14 and a terrestrial data network 18.
- Feeder Link: a link used for communication between the network device 16 and the satellite 14;
- Service Link: a link used for communication between a UE 12 and the satellite 14;
- Satellite 14: depending on functions it provides, it can be divided into transparent load and regenerative load.
- Transparent load: it only provides functions of radio frequency filtering, frequency conversion and amplification, and only provides transparent forwarding of signals, without changing waveform signals it forwards.
- Regenerative load: in addition to providing functions of radio frequency filtering, frequency conversion and amplification, it can also provide functions of demodulation/decoding, routing/switching, encoding/modulation. It has part or all of the functions of the base station.
- ISL (Inter-Satellite Link): It exists in the NTN scenario of regenerative load.

Figure 3:
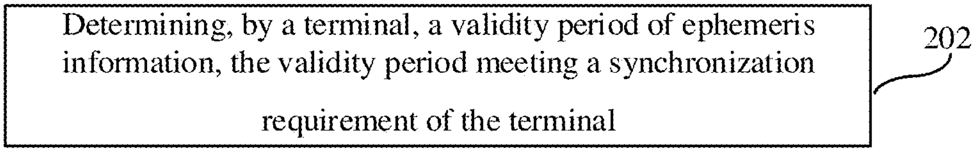
FIG. 3 is a flowchart illustrating a validity period determining method according to an embodiment of the present disclosure.

FIG. 3 is a flowchart illustrating a validity period determining method according to an exemplary embodiment of the present disclosure. In this embodiment, the method can be performed by the terminal in FIG. 1. The method includes the following action.

At Step 202, the terminal determines a validity period of ephemeris information, the validity period meeting a synchronization requirement of the terminal.

Conventionally, the validity period of ephemeris information is generally within 4 hours centered at reference time. Within this time range, the ephemeris information of a satellite is considered to be valid. Ephemeris information beyond this validity period is considered as expired and invalid. However, even with the valid ephemeris information, the time delay and Doppler frequency shift estimated by the terminal based on its own current position and the ephemeris information cannot guarantee to meet the synchronization requirement.

In the present disclosure, the terminal determines the validity period of the ephemeris information, or the terminal determines a maximum value of the validity period of the ephemeris information. The validity period or the maximum value can meet the synchronization requirement of the terminal. That is, under the condition that the validity period or the maximum value is not exceeded, the time delay and Doppler frequency shift estimated by the terminal according to its own current position and the ephemeris information can meet the synchronization requirement. When the validity period or the maximum value is exceeded, the terminal expects the network device to update the satellite's ephemeris information.

The terminal determining the validity period of the ephemeris information may include, but not limited to, at least one of the following three schemes:

Scheme 1: The terminal determines the validity period of the ephemeris information predefined in a communication protocol.

On the premise of meeting an uplink synchronization requirement of the terminal, the communication protocol predefines the validity period of the ephemeris information or the maximum value of the validity period. The terminal determines the validity period of the ephemeris information predefined in the communication protocol, or the terminal determines the maximum value of the validity period of the ephemeris information predefined in the communication protocol.

Scheme 2: The terminal receives the validity period of the ephemeris information configured by a network device.

On the premise of meeting an uplink synchronization requirement of the terminal, the network device configures the validity period of the ephemeris information for the terminal, or configures the maximum value of the validity period of the ephemeris information for the terminal. The terminal receives the validity period of the ephemeris information configured by the network device, or the maximum value of the validity period of the terminal received ephemeris information configured by the network device.

Scheme 3: The terminal reports a suggested validity period of the ephemeris information to the network device, and the network device configures the validity period of the ephemeris information for the terminal. The validity period is not longer than the suggested validity period reported by the terminal.

It should be noted that the "validity period" and "the maximum value of the validity period" in the present disclosure may be used interchangeably.

To summarize, by determining the validity period of the ephemeris information that meets the synchronization requirement, the real-time accuracy of the ephemeris information at the terminal can be ensured, thereby ensuring that a time delay and a Doppler frequency shift calculated by the terminal based on the ephemeris information have only small errors. Since the errors do not exceed a range tolerated by the synchronization requirement, the synchronization performance of the terminal can be guaranteed.

The following embodiment are provided for Scheme 1.

Figure 4:
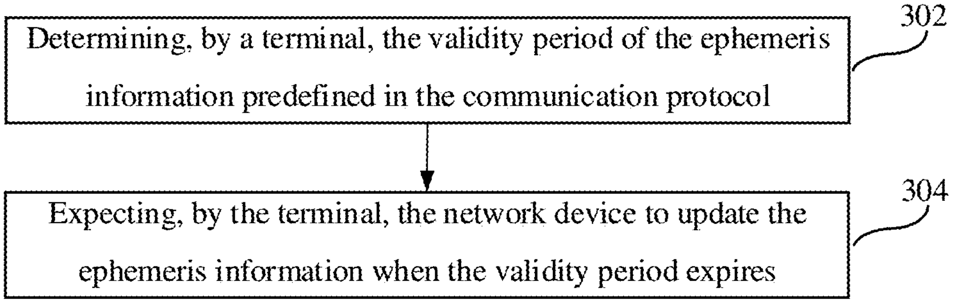
FIG. 4 is a flowchart illustrating a validity period determining method according to an embodiment of the present disclosure.

FIG. 4 is a flowchart of a validity period determining method according to an exemplary embodiment of the present disclosure. This method can be performed by the terminal in FIG. 1. The method includes the following action.

At Step 302, the terminal determines the validity period of the ephemeris information predefined in the communication protocol.

On the premise of meeting an uplink synchronization requirement of the terminal, the communication protocol predefines the validity period of the ephemeris information or the maximum value of the validity period. The validity period of the ephemeris information or the maximum value of the validity period is stored in the terminal.

In some embodiments, the validity period or the maximum value of the validity period stored in the memory of the terminal is stored at manufacture. Alternatively, the validity period or the maximum value of the validity period stored in the memory of the terminal is stored at Over The Air (OTA) upgrade.

The terminal determines the validity period of the ephemeris information predefined in the communication protocol according to the information stored in the memory, or the terminal determines the maximum value of the validity period of the ephemeris information predefined in the communication protocol according to the information stored in the memory.

At Step 304, when the validity period expires, the terminal expects the network device to update the ephemeris information.

When the validity period expires or is about to expire, the network device actively transmits the updated ephemeris information to the terminal, e.g., via at least one of broadcast message, Radio Resource Control (RRC), Medium Access Control Control Element (MAC CE), Downlink Control Information (DCI).

Alternatively, when the validity period expires or is about to expire, the terminal transmits an update request to the network device, and the network device transmits an update response to the terminal, the update response carrying updated ephemeris information.

After updating the ephemeris information, the terminal re-estimates the time delay and Doppler frequency shift in order to meet the synchronization requirement. Herein, the time delay can be represented by an uplink Time Advance (TA).

To summarize, by determining the validity period of the ephemeris information that meets the synchronization requirement, the real-time accuracy of the ephemeris information at the terminal can be ensured, thereby ensuring that a time delay and a Doppler frequency shift calculated by the terminal based on the ephemeris information have only small errors. Since the errors do not exceed a range tolerated by the synchronization requirement, the synchronization performance of the terminal can be guaranteed.

The following embodiment are provided for Scheme 2.

Figure 5:
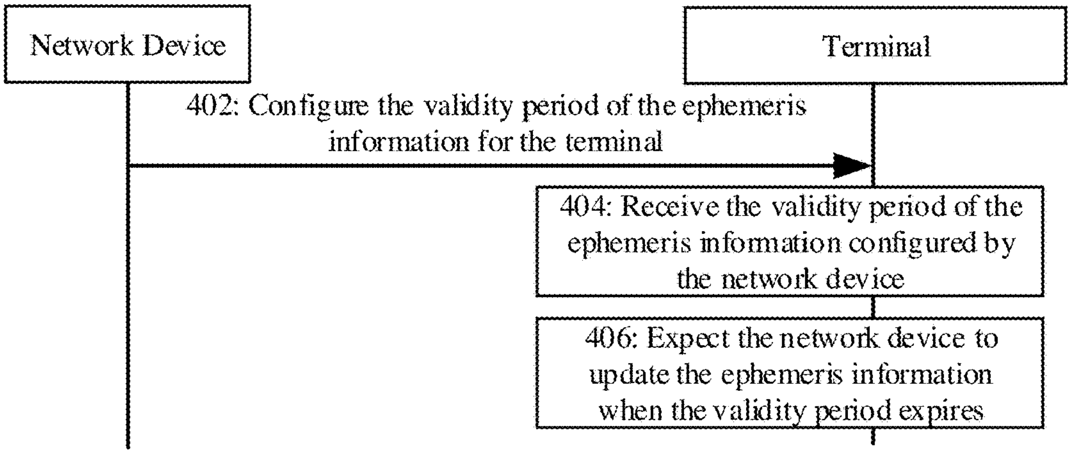
FIG. 5 is a flowchart illustrating a validity period determining method according to an embodiment of the present disclosure.

FIG. 5 is a flowchart illustrating a validity period determining method according to an exemplary embodiment of the present disclosure. The method can be performed by the terminal and the network device in FIG. 1. The method includes the following actions.

At Step 402, the network device configures the validity period of the ephemeris information for the terminal.

On the premise of meeting an uplink synchronization requirement of the terminal, the network device configures the validity period of the ephemeris information for the terminal, or the network device configures the maximum value of the validity period of the ephemeris information for the terminal.

In some embodiments, this step can be implemented as at least one of the following steps:

The network device configures the validity period or the maximum value of the ephemeris information for the terminal based on a satellite scenario.

Exemplarily, the satellite scenario may include at least one of LEO, MEO, GEO, or HEO. Among them, LEO has the lowest orbital altitude and HEO has the highest orbital altitude. In another example, the satellite scenario may include at least one of LEO, MEO, or GEO.

In the LEO scenario, the validity period of the ephemeris information configured by the network device is a first time length. In the MEO scenario, the validity period of the ephemeris information configured by the network device is a second time length. In the GEO scenario, the validity period of the ephemeris information configured by the network device is a third time length.

Exemplarily, any two of the first time length, the second time length and the third time length may have a same granularity or different granularities. The granularity refers to the specific values of the first time length, the second time length, and the third time length.

Exemplarily, any two of the first time length, the second time length, and the third time length may be in a same time unit or different time units. The time unit includes at least one of second, millisecond, microsecond, nanosecond, time slot, subframe, or frame.

The network device configures the validity period or the maximum validity period of the ephemeris information for the terminal based on a maximum value of a common TA.

The maximum value of the common TA is 2 times the delay of the feeder link. The minimum value of the common TA is 0 or a TA margin. Here, a TA margin is a parameter discussed in a communication protocol.

Exemplarily, the network device configures the maximum value of the common TA as the validity period of the ephemeris information or the maximum value of the validity period, that is, the validity period is equal to the maximum value of the common TA.

Exemplarily, the network device configures a product of the maximum value of the common TA and x % as the validity period of the ephemeris information or the maximum value of the validity period. That is, the validity period is equal to the product of the maximum value of the common TA and x %, where x % is configured by the network device, or x % is predefined in the communication protocol.

The network device configures the validity period of the ephemeris information or the maximum value of the validity period for the terminal based on a Cyclic Prefix (CP) length.

The CP lengths corresponding to different subcarriers are different. Considering that the CP lengths of different signals are also different, the validity period of the satellite's ephemeris information will also be affected by the CP lengths corresponding to different subcarriers of different signals.

Exemplarily, the network device configures a product of the CP length and y % as the validity period of the ephemeris information or the maximum value of the validity period. That is, the validity period is equal to the product of the CP length and y %, where y % is configured by the network device, or y % is predefined by the communication protocol.

Exemplarily, the CP length may be a Physical Random Access Channel Cyclic Prefix (PRACH CP) or a Physical Uplink Shared Channel Cyclic Prefix (PUSCH CP). Exemplarily, assuming that the subcarrier spacing is 120 kHz, taking the CP length of the PRACH signal as a reference, at 120 kHz, the long CP is 1.11 us, and the short CP is 0.59 us, then the validity period of the satellite's ephemeris information configured by the network device can be 0.59 us.

The network device configures the validity period of the ephemeris information or the maximum value of the validity period for the terminal according to a terminal capability of the terminal.

Terminal capabilities of different terminals are different. For example, the computing capability of a first terminal may be relatively high, and the computing capability of a second terminal may be relatively low. For example, a synchronization capability of a first terminal is high, and a synchronization capability of a second terminal is low. For example, a first terminal has a capability of uplink timing advance compensation, and a second terminal have no capability of uplink timing advance compensation. The "terminal capability" here refers to any one or more capabilities related to the synchronization process at the terminal.

Exemplarily, different terminal capabilities are mapped to different validity periods of ephemeris information. For example, the correspondence between terminal capabilities and validity periods is shown in Table 1 below:

TABLE 1

| Terminal Capability | Validity Period |
|---|---|
| Terminal Capability 1 | Fourth Time Length |
| Terminal Capability 2 | Fifth Time Length |
| Terminal Capability 3 | Sixth Time Length |

Exemplarily, any two of the fourth time length, the fifth time length and the sixth time length have generally different granularities, or they may have the same granularity. The granularity refers to specific values of the fourth time length, the fifth time length, and the sixth time length.

Exemplarily, any two of the fourth time length, the fifth time length and the sixth time length may be in a same time unit or different time units. In this case, the terminal transmits or reports the terminal capability of the terminal to the network device, and the network device receives the terminal capability reported by the terminal.

In some embodiments, the above validity period may be carried in at least one of:

System Information Block (SIB) message;

UE-specific RRC message;

Cell-specific RRC message;

MAC CE command; or

DCI message.

At Step 404, the terminal receives the validity period of the ephemeris information configured by the network device.

At Step 406, when the validity period is exceeded, the terminal expects the network device to update the ephemeris information.

When the validity period expires or is about to expire, the network device actively transmits the updated ephemeris information to the terminal, e.g., via at least one of broadcast message, Radio Resource Control (RRC), Medium Access Control Control Element (MAC CE), Downlink Control Information (DCI).

Alternatively, when the validity period expires or is about to expire, the terminal transmits an update request to the network device, and the network device transmits an update response to the terminal, the update response carrying updated ephemeris information.

After updating the ephemeris information, the terminal re-estimates the time delay and Doppler frequency shift in order to meet the synchronization requirement. Herein, the time delay can be represented by an uplink Time Advance (TA).

To summarize, by determining the validity period of the ephemeris information that meets the synchronization requirement, the real-time accuracy of the ephemeris information at the terminal can be ensured, thereby ensuring that a time delay and a Doppler frequency shift calculated by the terminal based on the ephemeris information have only small errors. Since the errors do not exceed a range tolerated by the synchronization requirement, the synchronization performance of the terminal can be guaranteed.

With the method according to this embodiment, the network device sets the validity period of the ephemeris information according to the satellite scenario, the maximum value of the common TA, or the CP length, so as to ensure that the validity period of the ephemeris information meets the synchronization requirement of the terminal, and ensure that the errors do not exceed a range tolerated by the synchronization requirement.

The following embodiment are provided for Scheme 3.

Figure 6:
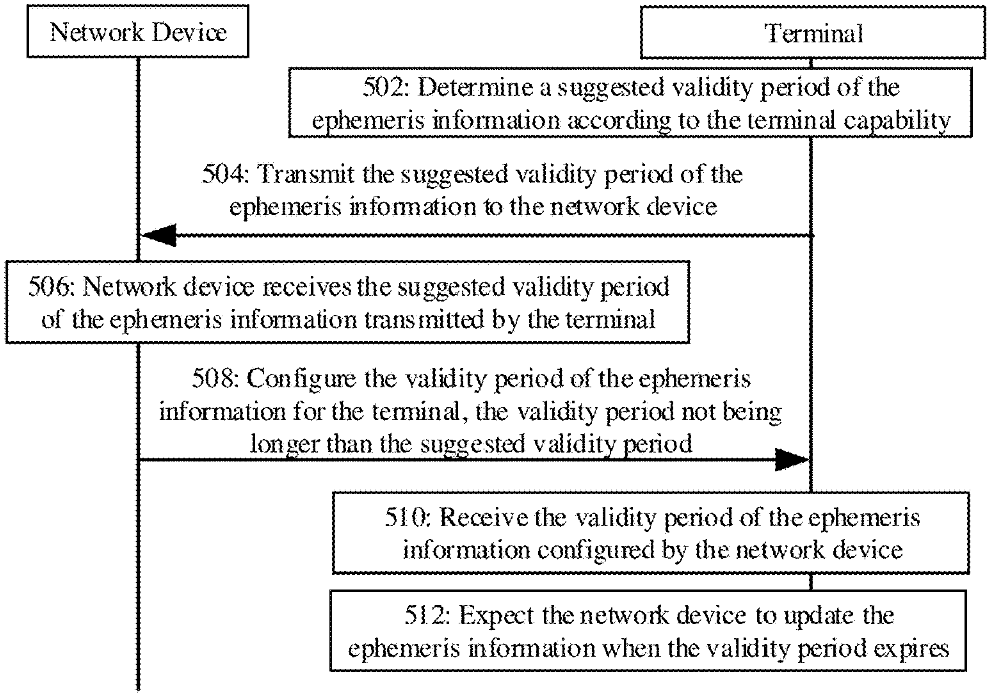
FIG. 6 is a flowchart illustrating a validity period determining method according to an embodiment of the present disclosure.

FIG. 6 is a flowchart illustrating a validity period determining method according to an exemplary embodiment of the present disclosure. The method can be performed by the terminal and the network device in FIG. 1. The method includes the following actions.

At Step 502, the terminal determines a suggested validity period of the ephemeris information according to the terminal capability.

Terminal capabilities of different terminals are different. For example, the computing capability of a first terminal may be relatively high, and the computing capability of a second terminal may be relatively low. For example, a synchronization capability of a first terminal is high, and a synchronization capability of a second terminal is low. For example, a first terminal has a capability of uplink timing advance compensation, and a second terminal have no capability of uplink timing advance compensation. The "terminal capability" here refers to any one or more capabilities related to the synchronization process at the terminal.

Exemplarily, the terminal determines the suggested validity period of the ephemeris information according to a correspondence between terminal capabilities and validity periods. For example, different terminal capabilities are mapped to different suggested validity periods of ephemeris information. For example, the correspondence between terminal capabilities and suggested validity periods is shown in Table 2 below:

TABLE 2

| Terminal Capability | Validity Period |
|---|---|
| Terminal Capability 1 | Seventh Time Length |
| Terminal Capability 2 | Eighth Time Length |
| Terminal Capability 3 | Ninth Time Length |

Exemplarily, any two of the seventh time length, the eighth time length and the ninth time length have generally different granularities, or they may have the same granularity. The granularity refers to specific values of the seventh time length, the eighth time length, and the ninth time length.

Exemplarily, any two of the seventh time length, the eighth time length and the ninth time length may be in a same time unit or different time units.

Exemplarily, the terminal determines the suggested validity period of the ephemeris information according to its own compensation capability. The suggested validity period does not exceed an upper limit of the compensation capability of the terminal.

Exemplarily, the suggested validity period is also referred to as a suggested maximum value of the validity period.

At Step 504, the terminal transmits the suggested validity period of the ephemeris information to the network device.

In some embodiments, the suggested validity period may be carried in at least one of:

UE-specific RRC message;

MAC CE command; or

Uplink Control Information (UCI) message.

At Step 506, the network device receives the suggested validity period of the ephemeris information transmitted by the terminal.

At Step 508, the network device configures the validity period of the ephemeris information for the terminal, and the validity period is not longer than the suggested validity period.

In some embodiments, the network device may directly use the suggested validity period as the configured validity period, and configure the validity period of the ephemeris information for the terminal. That is, the suggested validity period is equal to the validity period.

In some embodiments, the network device may determine the validity period of the ephemeris information according to a predetermined policy, and configure the validity period determined according to the predetermined policy for the terminal when the validity period of the ephemeris information determined according to the predetermined policy is shorter than the suggested validity period, or configure the suggested validity period for the terminal when the validity period of the ephemeris information according to the predetermined policy is equal to or longer than the suggested validity period.

In some embodiments, the network device determining the validity period of the ephemeris information according to the predetermined policy may include, but not limited to, one of the following three modes:

The network device configures the validity period of the ephemeris information or the maximum value of the validity period for the terminal based on a satellite scenario.

Exemplarily, the satellite scenario may include at least one of LEO, MEO, GEO, or HEO. Among them, LEO has the lowest orbital altitude and HEO has the highest orbital altitude. In another example, the satellite scenario may include at least one of LEO, MEO, or GEO.

In the LEO scenario, the validity period of the ephemeris information configured by the network device is a first time length. In the MEO scenario, the validity period of the ephemeris information configured by the network device is a second time length. In the GEO scenario, the validity period of the ephemeris information configured by the network device is a third time length. Here, the first time length is longer than the second time length, and the second time length is longer than the third time length.

Exemplarily, any two of the first time length, the second time length, and the third time length may be in a same time unit or different time units. The time unit includes at least one of second, millisecond, microsecond, nanosecond, time slot, subframe, or frame.

Exemplarily, any two of the first time length, the second time length and the third time length may have a same granularity or different granularities. The granularity refers to the specific values of the first time length, the second time length, and the third time length.

The network device configures the validity period of the ephemeris information or the maximum value of the validity period for the terminal based on a maximum value of a common TA.

The maximum value of the common TA is 2 times the delay of the feeder link. The minimum value of the common TA is 0 or a TA margin. Here, a TA margin is a parameter discussed in a communication protocol.

Exemplarily, the network device configures the maximum value of the common TA as the validity period of the ephemeris information or the maximum value of the validity period, that is, the validity period is equal to the maximum value of the common TA.

Exemplarily, the network device configures a product of the maximum value of the common TA and x % as the validity period of the ephemeris information or the maximum value of the validity period. That is, the validity period is equal to the product of the maximum value of the common TA and x %, where x % is configured by the network device, or x % is predefined in the communication protocol.

The network device configures the validity period of the ephemeris information or the maximum value of the validity period for the terminal based on a Cyclic Prefix (CP) length.

The CP lengths corresponding to different subcarriers are different. Considering that the CP lengths of different signals are also different, the validity period of the satellite's ephemeris information will also be affected by the CP lengths corresponding to different subcarriers of different signals.

Exemplarily, the network device configures a product of the CP length and y % as the validity period of the ephemeris information or the maximum value of the validity period. That is, the validity period is equal to the product of the CP length and y %, where y % is configured by the network device, or y % is predefined by the communication protocol.

Exemplarily, the CP length may be a PRACH CP or a PUSCH CP. Exemplarily, assuming that the subcarrier spacing is 120 kHz, taking the CP length of the PRACH signal as a reference, at 120 kHz, the long CP is 1.11 us, and the short CP is 0.59 us, then the validity period of the satellite's ephemeris information configured by the network device can be 0.59 us.

In some embodiments, the above validity period may be carried in at least one of:

SIB message;

UE-specific RRC message;

Cell-specific RRC message;

MAC CE command; or

DCI message.

At Step 510, the terminal receives the validity period of the ephemeris information configured by the network device.

Here, the time unit of the validity period is at least one of second, millisecond, microsecond, nanosecond, time slot, subframe, or frame. The time unit of the suggested validity period is at least one of second, millisecond, microsecond, nanosecond, time slot, subframe, or frame.

Exemplarily, the time unit of the validity period may be same as that of the suggested validity period; or the time unit of the validity period may be different from that of the suggested validity period. Exemplarily, the granularity of the validity period may be same as that of the suggested validity period, or the granularity of the validity period may be different from that of the suggested validity period. For example, the value of the validity period may be shorter than the suggested validity period.

At Step 512, when the validity period expires, the terminal expects the network device to update the ephemeris information.

When the validity period expires or is about to expire, the network device actively transmits the updated ephemeris information to the terminal, e.g., via at least one of broadcast message, Radio Resource Control (RRC), Medium Access Control Control Element (MAC CE), Downlink Control Information (DCI).

Alternatively, when the validity period expires or is about to expire, the terminal transmits an update request to the network device, and the network device transmits an update response to the terminal, the update response carrying updated ephemeris information.

After updating the ephemeris information, the terminal re-estimates the time delay and Doppler frequency shift in order to meet the synchronization requirement. Herein, the time delay can be represented by an uplink Time Advance (TA).

To summarize, by determining the validity period of the ephemeris information that meets the synchronization requirement, the real-time accuracy of the ephemeris information at the terminal can be ensured, thereby ensuring that a time delay and a Doppler frequency shift calculated by the terminal based on the ephemeris information have only small errors. Since the errors do not exceed a range tolerated by the synchronization requirement, the synchronization performance of the terminal can be guaranteed.

With the method according to this embodiment, the terminal reports the suggested validity period determined based on the terminal capability to the network device, which ensures that the validity period of the ephemeris information does not exceed the upper limit of the compensation capability of the terminal, thereby ensuring that the errors do not exceed a range tolerated by the synchronization requirement.

Figure 7:
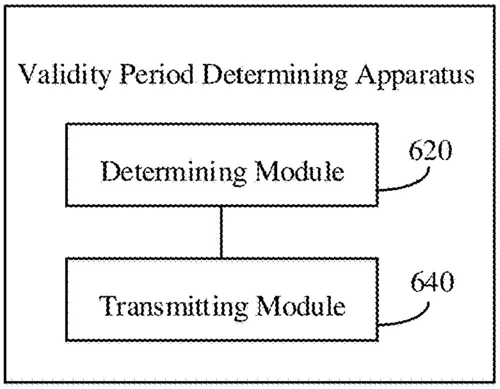
FIG. 7 is a schematic diagram showing a structure of a validity period determining apparatus according to an embodiment of the present disclosure.

FIG. 7 shows a block diagram of a validity period determining apparatus according to an exemplary embodiment of the present disclosure. The apparatus can be applied in a terminal, or implemented as a part of the terminal. The apparatus includes:

a determining module 620 configured to determine a validity period of ephemeris information, the validity period meeting a synchronization requirement of the terminal.

In some embodiments, the determining module 620 may be configured to receive the validity period of the ephemeris information configured by a network device.

In some embodiments, the validity period may be configured by the network device based on a satellite scenario, the satellite scenario including at least one of Low-Earth Orbit (LEO), Medium-Earth Orbit (MEO), Geostationary Earth Orbit (GEO), or High Elliptical Orbit (HEO); or the validity period may be configured by the network device based on a maximum value of a common Timing Advance (TA); or the validity period may be configured by the network device based on a Cyclic Prefix (CP) length; or the validity period may be configured by the network device based on a terminal capability of the terminal.

In some embodiments, the validity period may be carried in at least one of: a System Information Block (SIB) message; a UE-specific Radio Resource Control (RRC) message; a cell-specific Radio Resource Control (RRC) message; a Media Access Control Control Element (MAC CE) command; or a Downlink Control Information (DCI) message.

In some embodiments, a time unit of the validity period may be at least one of second, millisecond, microsecond, nanosecond, time slot, subframe, or frame.

In some embodiments, the apparatus may further include: a transmitting module 640 configured to transmit or report a suggested validity period of the ephemeris information to the network device.

In some embodiments, the determining module 620 may be configured to determine the suggested validity period of the ephemeris information according to a terminal capability.

In some embodiments, the suggested maximum value may be carried in at least one of: a UE-specific Radio Resource Control (RRC) message; a Media Access Control Control Element (MAC CE) command; or an Uplink Control Information (UCI) message.

In some embodiments, the validity period may be shorter than or equal to the suggested validity period.

In some embodiments, a time unit of the validity period may be same as that of the suggested validity period; or the time unit of the validity period may be different from that of the suggested validity period.

In some embodiments, a granularity of the validity period may be same as that of the suggested validity period; or the granularity of the validity period may be different from that of the suggested validity period.

In some embodiments, the transmitting module 640 may be configured to transmit or report the terminal capability of the terminal to the network device.

In some embodiments, the determining module 620 may be configured to determine the validity period of the ephemeris information predefined in a communication protocol.

Figure 8:
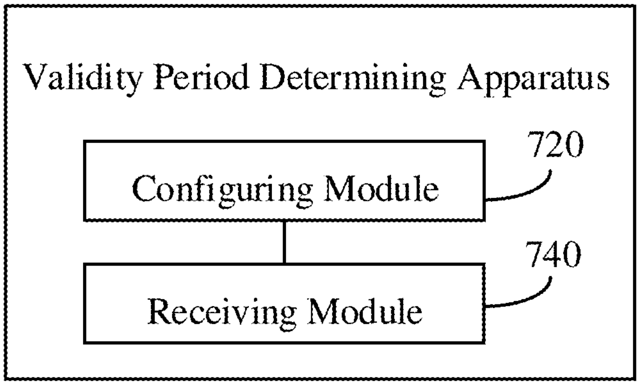
FIG. 8 is a schematic diagram showing a structure of a validity period determining apparatus according to an embodiment of the present disclosure.

FIG. 8 shows a block diagram of a validity period determining apparatus according to an exemplary embodiment of the present disclosure. The apparatus can be applied in a network device, or implemented as a part of the network device. The apparatus includes:

a configuring module 720 configured to configure a validity period of ephemeris information for a terminal, the validity period meeting a synchronization requirement of the terminal.

In some embodiments, the configuring module 720 may be configured to: configure the validity period of the ephemeris information for the terminal based on a satellite scenario, the satellite scenario including at least one of Low-Earth Orbit (LEO), Medium-Earth Orbit (MEO), Geostationary Earth Orbit (GEO), or High Elliptical Orbit (HEO); or configure the validity period of the ephemeris information for the terminal based on a maximum value of a common Timing Advance (TA); or configure the validity period of the ephemeris information for the terminal based on a Cyclic Prefix (CP) length; or configure the validity period of the ephemeris information for the terminal based on a terminal capability of the terminal.

In some embodiments, the validity period is carried in at least one of: an SIB message; a UE-specific RRC message; a cell-specific RRC message; a MAC CE command; or a DCI message.

In some embodiments, a time unit of the validity period may be at least one of second, millisecond, microsecond, nanosecond, time slot, subframe, or frame.

In some embodiments, the apparatus may further include: a receiving module 740 configured to receive a suggested validity period of the ephemeris information transmitted by the terminal.

In some embodiments, the suggested validity period may be determined based on the terminal capability of the terminal.

In some embodiments, the suggested maximum value may be carried in at least one of: a UE-specific RRC message; a MAC CE command; or a UCI message.

In some embodiments, the validity period may be shorter than or equal to the suggested validity period.

In some embodiments, a time unit of the validity period may be same as that of the suggested validity period; or the time unit of the validity period may be different from that of the suggested validity period.

In some embodiments, a granularity of the validity period may be the same as that of the suggested validity period; or the granularity of the validity period may be different from that of the suggested validity period.

In some embodiments, the receiving module 740 may be configured to receive the terminal capability transmitted by the terminal.

It should be noted that when the apparatus according to the above embodiment implements its functions, the division of the above functional modules is used as an example for illustration only. In practical applications, the above functions can be allocated to different functional modules according to actual needs. That is, the content or structure of the apparatus can be divided into different functional modules to complete all or part of the functions described above.

Regarding the apparatus in the above embodiment, the specific implementation for each module to perform operations has been described in detail in the embodiments related to the method, and details thereof will be omitted here.

Figure 9:
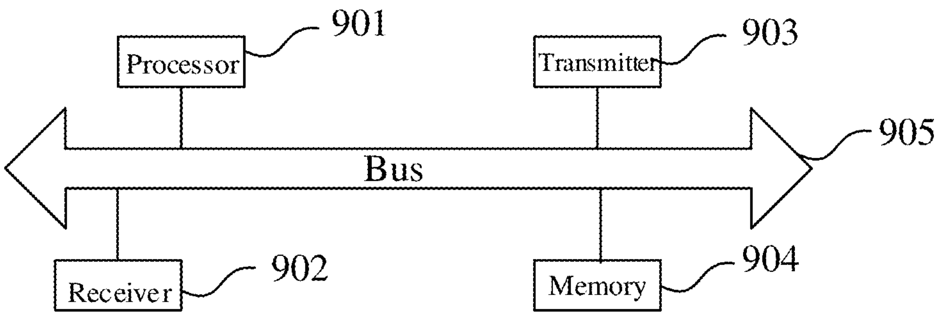
FIG. 9 is a schematic diagram showing a structure of a terminal or network device according to an embodiment of the present disclosure.

FIG. 9 is a schematic diagram showing a structure of a terminal or network device according to an exemplary embodiment of the present disclosure. The terminal or network device includes: a processor 901, a receiver 902, a transmitter 903, a memory 904, and a bus 905.

The processor 901 includes one or more processing cores, and the processor 901 executes various functional applications and information processing by executing software programs and modules.

The receiver 902 and the transmitter 903 can be implemented as a communication component, and the communication component can be a communication chip.

The memory 904 is connected to the processor 901 via the bus 905.

The memory 904 may store at least one instruction, and the processor 901 may be configured to execute the at least one instruction, so as to implement the steps in any of the above method embodiments.

In addition, the memory 904 can be implemented as any type of volatile or non-volatile storage device or any combination thereof. The volatile or non-volatile storage device includes but not limited to: magnetic disk or optical disc, Electrically Erasable Programmable Read Only Memory (EEPROM), Erasable Programmable Read Only Memory (EPROM), Static Random-Access Memory (SRAM), Read Only Memory (ROM), magnetic memory, flash memory, or Programmable Read Only Memory (PROM).

In an exemplary embodiment, a computer-readable storage medium is also provided. The computer-readable storage medium has at least one instruction stored therein. For example, a memory may include instructions that can be executed by a processor to implement the above method embodiments. For example, the computer-readable storage medium can be ROM, Random-Access Memory (RAM), Compact Disc Read Only Memory (CD-ROM), magnetic tape, floppy disk, and optical data storage device, etc. In some embodiments, the computer-readable storage medium may be a non-transitory computer-readable storage medium.

In an exemplary embodiment, an embodiment of the present disclosure provides a computer program product or computer program. The computer program product or computer program includes one or more instructions, and the one or more instructions are stored in a computer-readable storage medium. One or more processors of the terminal device read the one or more instructions from the computer-readable storage medium, and execute the one or more instructions, such that the terminal or network device implements the above method embodiments.

It should be understood that the term "plurality" as used herein means two or more. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

Other embodiments of the present disclosure may be readily envisaged by those skilled in the art after considering the description and practicing the present disclosure. The present disclosure is intended to cover any variants, uses, or adaptations of the present disclosure without departing from the general principles of the present disclosure and the common knowledge or conventional techniques in the related art. The description and embodiments are to be regarded as exemplary only, and the scope and spirit of the present disclosure are defined by the claims as attached.

It can be appreciated that the present disclosure is not limited to the exact structures described above and illustrated in the accompanying drawings, and that various modifications and changes may be made without departing from the scope of the present disclosure, which is defined only by the claims as attached.

What is claimed is:

1. A validity period determining method, comprising:

receiving, by a terminal, a validity period of ephemeris information configured by a network device, wherein the validity period meets a synchronization requirement of the terminal and the validity period is carried in at least one of a cell-specific Radio Resource Control (RRC) message or a user equipment-specific RRC message, and a time unit of the validity period is second.

2. The method according to claim 1, wherein the validity period is configured by the network device based on a satellite scenario, the satellite scenario comprising at least one of Low-Earth Orbit (LEO), Medium-Earth Orbit (MEO), Geostationary Earth Orbit (GEO), or High Elliptical Orbit (HEO); or the validity period is configured by the network device based on a maximum value of a common Timing Advance (TA); or the validity period is configured by the network device based on a Cyclic Prefix (CP) length; or the validity period is configured by the network device based on a terminal capability of the terminal.

3. The method according to claim 1, further comprising:

expecting, by the terminal when the validity period is exceeded, the network device to update the ephemeris information.

4. A validity period determining method, comprising:

configuring, by a network device, a validity period of ephemeris information for a terminal, wherein the validity period meets a synchronization requirement of the terminal and the validity period is carried in at least one of a cell-specific Radio Resource Control (RRC) message or a user equipment-specific RRC message, and a time unit of the validity period is second.

5. The method according to claim 4, wherein said configuring, by the network device, the validity period of the ephemeris information for the terminal comprises:

configuring, by the network device, the validity period of the ephemeris information for the terminal based on a satellite scenario, the satellite scenario comprising at least one of Low-Earth Orbit (LEO), Medium-Earth Orbit (MEO), Geostationary Earth Orbit (GEO), or High Elliptical Orbit (HEO); or configuring, by the network device, the validity period of the ephemeris information for the terminal based on a maximum value of a common Timing Advance (TA); or configuring, by the network device, the validity period of the ephemeris information for the terminal based on a Cyclic Prefix (CP) length; or configuring, by the network device, the validity period of the ephemeris information for the terminal based on a terminal capability of the terminal.

6. A terminal, comprising:

one or more processors; and one or more transceivers connected to the one or more processors, wherein the one or more processors are configured to load and execute executable instructions, so as to:

receive a validity period of ephemeris information configured by a network device, wherein the validity period meets a synchronization requirement of the terminal and the validity period is carried in at least one of a cell-specific Radio Resource Control (RRC) message or a user equipment-specific RRC message, and a time unit of the validity period is second.

7. The terminal according to claim 6, wherein the validity period is configured by the network device based on a satellite scenario, the satellite scenario comprising at least one of Low-Earth Orbit (LEO), Medium-Earth Orbit (MEO), Geostationary Earth Orbit (GEO), or High Elliptical Orbit (HEO); or the validity period is configured by the network device based on a maximum value of a common Timing Advance (TA); or the validity period is configured by the network device based on a Cyclic Prefix (CP) length; or the validity period is configured by the network device based on a terminal capability of the terminal.

8. A network device, comprising:

one or more processors; and one or more transceivers connected to the one or more processors, wherein the one or more processors are configured to load and execute executable instructions, so as to perform the validity period determining method according to claim 4.

9. The network device according to claim 8, wherein said configuring the validity period of the ephemeris information for the terminal comprises:

configuring the validity period of the ephemeris information for the terminal based on a satellite scenario, the satellite scenario comprising at least one of Low-Earth Orbit (LEO), Medium-Earth Orbit (MEO), Geostationary Earth Orbit (GEO), or High Elliptical Orbit (HEO); or configuring the validity period of the ephemeris information for the terminal based on a maximum value of a common Timing Advance (TA); or configuring the validity period of the ephemeris information for the terminal based on a Cyclic Prefix (CP) length; or configuring the validity period of the ephemeris information for the terminal based on a terminal capability of the terminal.

10. A non-transitory computer-readable storage medium, having a computer program stored therein, wherein the computer program is configured to be executed by a processor, so as to perform the validity period determining method according to claim 1.

* * * * *